US009804686B2

(12) United States Patent
Park

(10) Patent No.: US 9,804,686 B2
(45) Date of Patent: Oct. 31, 2017

(54) WEARABLE DISPLAY AND METHOD OF CONTROLLING THE WEARABLE DISPLAY GENERATING A USER INTERFACE ACCORDING TO THAT OF AN EXTERNAL DEVICE

(71) Applicant: Microsoft Technology Licensing, LLC, Redmond, WA (US)

(72) Inventor: Hyorim Park, Seoul (KR)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 13/926,648

(22) Filed: Jun. 25, 2013

(65) Prior Publication Data

US 2014/0139439 A1 May 22, 2014

Related U.S. Application Data

(63) Continuation of application No. 13/728,793, filed on Dec. 27, 2012, now Pat. No. 8,502,780.

(30) Foreign Application Priority Data

Nov. 20, 2012 (KR) .......................... 10-2012-0131673

(51) Int. Cl.
G06F 3/02 (2006.01)
G09G 5/00 (2006.01)
(Continued)

(52) U.S. Cl.
CPC ........ *G06F 3/0227* (2013.01); *G06F 3/04886* (2013.01); *G06F 21/42* (2013.01);
(Continued)

(58) Field of Classification Search
None
See application file for complete search history.

(56) References Cited

U.S. PATENT DOCUMENTS 5,825,436 A * 10/1998 Knight .................. G02F 1/1323
345/3.1
6,154,210 A * 11/2000 Anderson .............. G03B 17/02
345/173

(Continued)

FOREIGN PATENT DOCUMENTS

CN 101907921 A 12/2010
CN 102375652 A 3/2012
(Continued)

OTHER PUBLICATIONS

Nyang et al., Decryptable to Your Eyes: Visualization of Security Protocols at the User Interface, Dec. 10, 2011, Cornell University Library, arXiv:1112.2245 [cs.CR], pp. 1-15.*

(Continued)

*Primary Examiner* — Ilana Spar
*Assistant Examiner* — Kirk Hermann
(74) *Attorney, Agent, or Firm* — Alleman Hall Creasman & Tuttle LLP

(57) ABSTRACT

A Head Mount Display (HMD) and a method for controlling the HMD are disclosed. The method includes detecting an external device in an image captured by the HMD, recognizing at least one component from a first User Interface (UI) of the external device, the at least one component including a keypad or a window for outputting data corresponding to an input signal to the keypad, generating a second UI including the recognized at least one component, displaying the second UI in the HMD, wherein the at least one component of the first UI being displayed on the external device is overlaid with the displayed second UI using the image from which the external device is detected, (Continued)

and displaying data corresponding to an input signal currently received at the external device on the second UI in the HMD.

20 Claims, 15 Drawing Sheets

(51) Int. Cl.
    *G06F 3/0488*     (2013.01)
    *G06F 21/42*     (2013.01)
    *G06F 21/82*     (2013.01)
    *G06F 21/31*     (2013.01)
    *G02B 27/01*     (2006.01)

(52) U.S. Cl.
    CPC ...... *G06F 21/82* (2013.01); *G02B 2027/0178* (2013.01); *G06F 21/31* (2013.01); *G06F 2221/032* (2013.01)

(56) References Cited

U.S. PATENT DOCUMENTS

| | | | |
|---|---|---|---|
| 6,211,930 | B1 | 4/2001 | Sautter et al. |
| 8,228,315 | B1* | 7/2012 | Starner et al. ............... 345/175 |
| 2005/0140572 | A1* | 6/2005 | Kahan ..................... G09C 5/00 345/7 |
| 2005/0145807 | A1* | 7/2005 | Lapstun ................... B41J 3/445 250/566 |
| 2006/0020815 | A1* | 1/2006 | Varghese et al. ............ 713/182 |
| 2007/0236474 | A1* | 10/2007 | Ramstein ..................... 345/173 |
| 2008/0005702 | A1* | 1/2008 | Skourup et al. ............ 715/848 |
| 2008/0266323 | A1 | 10/2008 | Biocca et al. |
| 2009/0243968 | A1 | 10/2009 | Nakazawa |
| 2009/0300535 | A1* | 12/2009 | Skourup et al. ............ 715/773 |
| 2010/0199232 | A1* | 8/2010 | Mistry et al. ................ 715/863 |
| 2010/0218188 | A1 | 8/2010 | Jackson et al. |
| 2010/0238376 | A1* | 9/2010 | Sakai et al. ..................... 349/62 |
| 2011/0018903 | A1* | 1/2011 | Lapstun et al. .............. 345/633 |
| 2011/0096154 | A1* | 4/2011 | Nam ................. H04N 13/0429 348/53 |
| 2011/0213664 | A1 | 9/2011 | Osterhout et al. |
| 2011/0319166 | A1* | 12/2011 | Bathiche et al. .............. 463/40 |
| 2012/0144449 | A1* | 6/2012 | Peled et al. ...................... 726/1 |
| 2012/0183712 | A1* | 7/2012 | Leonhard et al. ........... 428/40.1 |
| 2012/0188179 | A1* | 7/2012 | Karlsson ..................... 345/173 |
| 2012/0218188 | A1* | 8/2012 | Kashitani ..................... 345/168 |
| 2012/0249587 | A1 | 10/2012 | Anderson et al. |
| 2012/0306790 | A1* | 12/2012 | Kyung et al. ................ 345/173 |
| 2013/0021225 | A1 | 1/2013 | Braun et al. |
| 2013/0069985 | A1* | 3/2013 | Wong et al. .................. 345/633 |
| 2013/0321452 | A1* | 12/2013 | Kawalkar et al. ............ 345/629 |
| 2014/0085190 | A1* | 3/2014 | Erinjippurath ..... G02B 27/0172 345/156 |

FOREIGN PATENT DOCUMENTS

| | | |
|---|---|---|
| CN | 102662585 A | 9/2012 |
| CN | 102694915 | 9/2012 |
| JP | 10-240186 A | 9/1998 |
| JP | 2004126973 A | 4/2004 |
| JP | 2012174208 A | 9/2012 |
| WO | 2009130985 A1 | 10/2009 |

OTHER PUBLICATIONS

European Patent Office, Office Action Issued in European Patent Application No. 13856404.2, Feb. 25, 2016, Germany, 6 Pages.
European Patent Office, Extended Search Report issued in European Patent Application No. 13856404.2, Oct. 28, 2015, Germany, 6 Pages.
ISA Korean Intellectual Property Office, International Search Report and Written Opinion Issued in PCT Application No. PCT/KR2013/000016, dated Aug. 27, 2013, 12 Pages.
U.S. Appl. No. 13/728,793, filed Dec. 27, 2012.
European Patent Office, Extended European Search Report Issued in Application No. 16180088.3, dated Nov. 3, 2016, Germany, 8 pages.
The State Intellectual Property Office of China, First Office Action and Search Report Issued in Chinese Patent Application No. 201380070790.4, dated Nov. 2, 2016, China, 13 pages.
European Patent Office, Communication under Rule 71(3) EPCpc (Intention to grant) Issued in European Patent Application No. 13856404.2, dated Nov. 9, 2016, Germany, 46 pages.
European Patent Office, Extended European Search Report issued in Application No. 17163436.3, dated Jul. 10, 2017, Germany, 9 pages.

* cited by examiner

FIG. 9
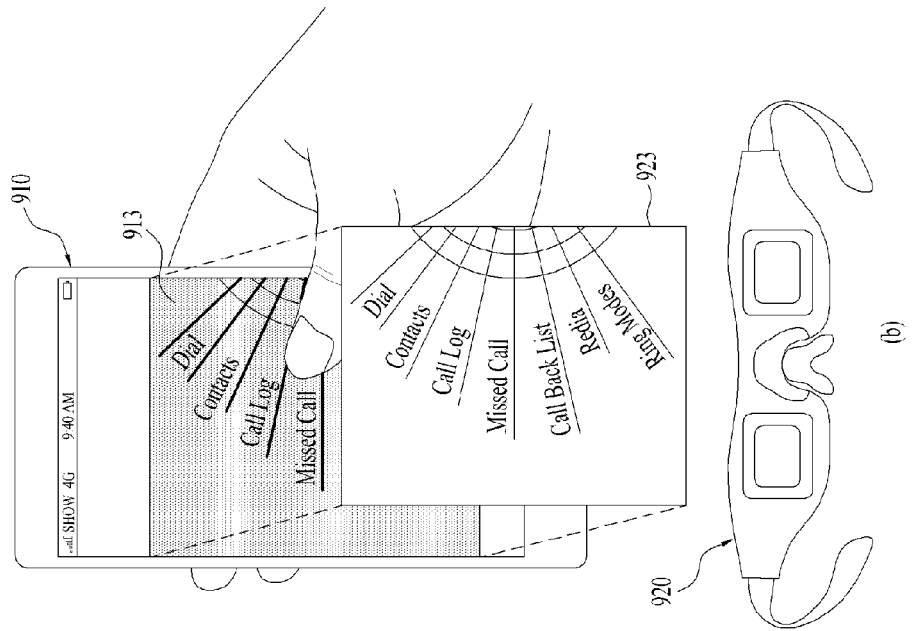
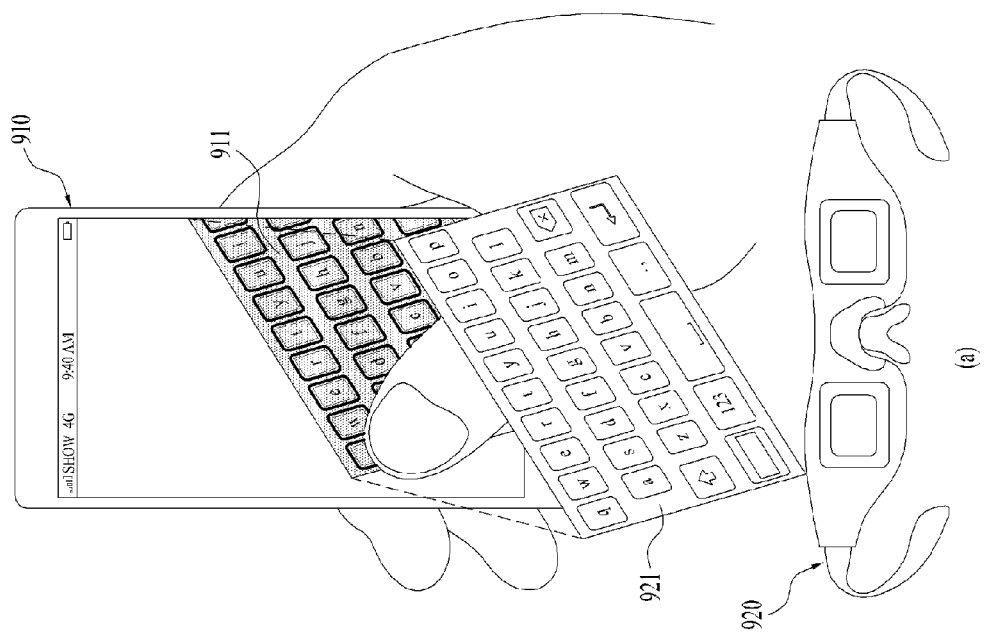

FIG. 10
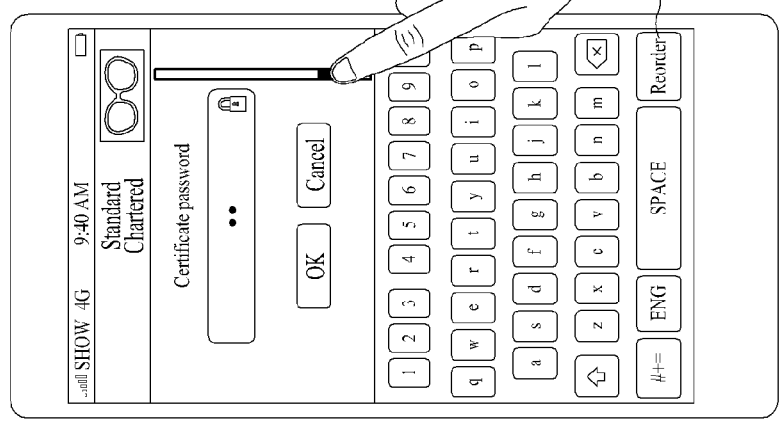
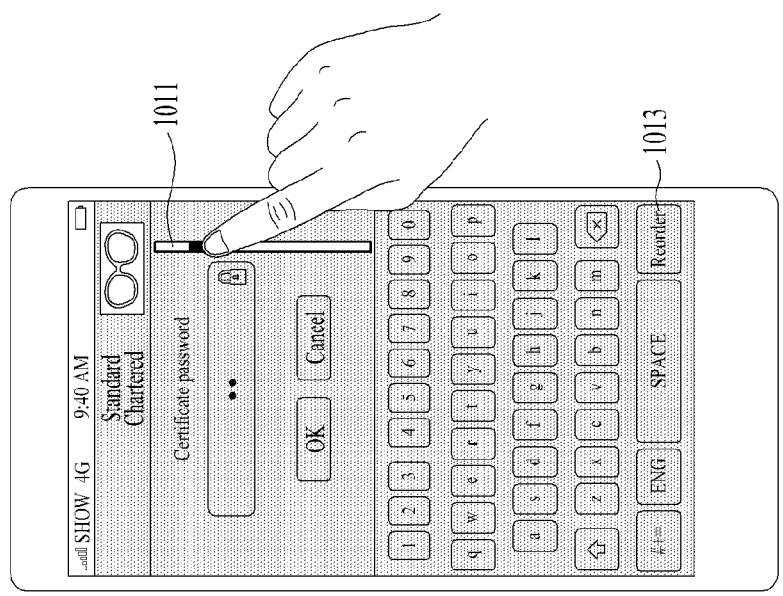

FIG. 12
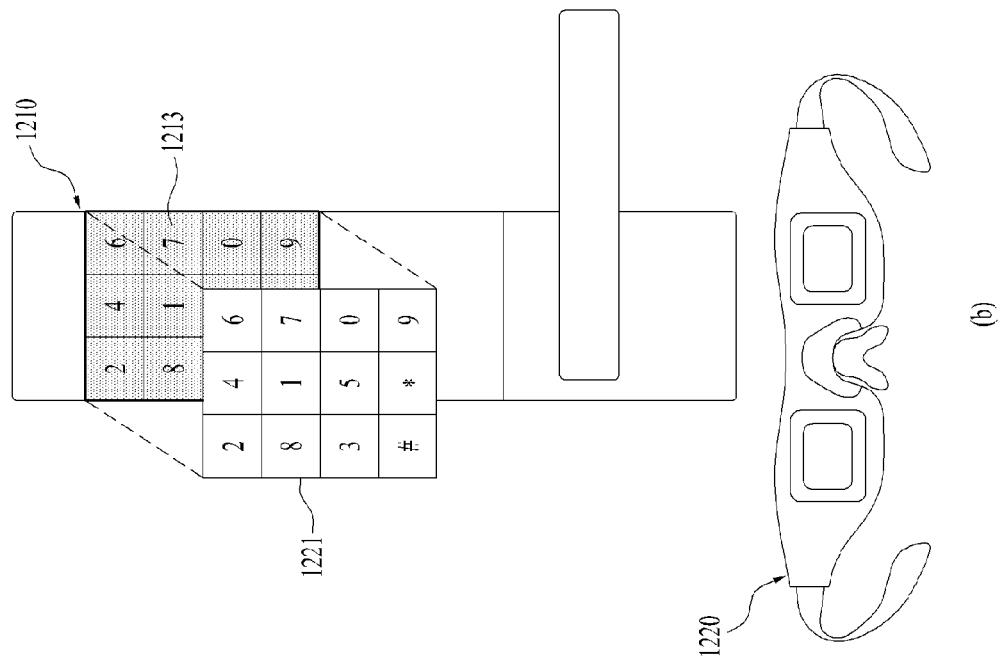
(b)
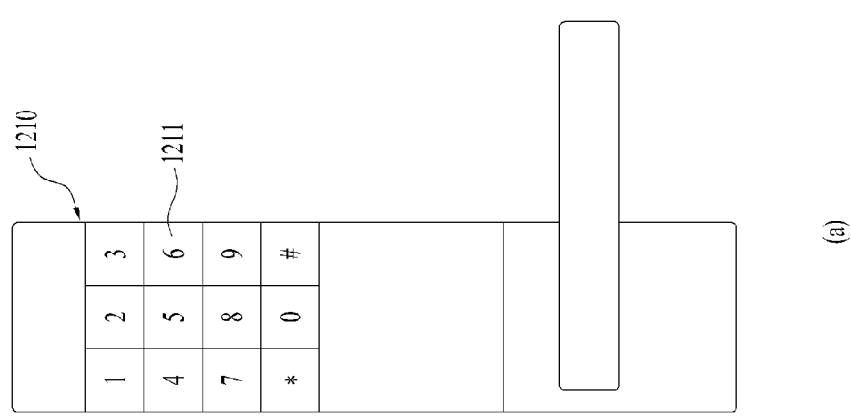
(a)

WEARABLE DISPLAY AND METHOD OF
CONTROLLING THE WEARABLE DISPLAY
GENERATING A USER INTERFACE
ACCORDING TO THAT OF AN EXTERNAL
DEVICE

This application is a Continuation of co-pending application Ser. No. 13/728,793, filed Dec. 27, 2012, which is the national phase of PCT International Application No. 10-2012-0131673 filed on Nov. 20, 2012. The entire contents of all of the above applications are hereby incorporated by reference.

BACKGROUND OF THE INVENTION

Field of the Invention

The present invention relates to a head mount display and a method for controlling the same, and more particularly, to a head mount display for allowing a user to view information requiring privacy protection, when the user displays the information on an external device, and a method for controlling the same.

Discussion of the Related Art

Along with the trend toward lightweight and small size for digital devices, more and more portable devices have been used. Therefore, users can readily execute intended tasks using portable devices at any time in any place. For example, banking service is available irrespective of time and place and contact is easily made between users through portable devices.

FIG. 1 illustrates an example of banking service in a conventional portable device.

Referring to FIG. 1, when a user intends to use the banking service through a portable device 10, the user should enter a certificate password. Because the certificate password needs security, its contents are not displayed, with a security indication 11 to prevent other people from viewing the certificate password. Therefore, a certain level of security is guaranteed during banking on the portable device 10.

However, when the user enters the certificate password, a specific key that the user is currently entering is enlarged on a keypad 12, as illustrated in FIG. 1. Once someone near to the user makes up his or her mind to find out the password, the user's password is easily known.

A Head Mount Display (HMD) refers to any image display apparatus wearable on a head like glasses, for displaying an image. The HMD is a kind of wearable computer that enables only a user to view displayed information. Accordingly, the user's privacy is readily protected since the information is not exposed to people around the user.

The HMD can be used in conjunction with various external devices. The HMD is connected to an external device through a network and thus can output content received from the external. Furthermore, the HMD can receive a user input to the external device or perform an operation in interaction with the external device.

SUMMARY OF THE INVENTION

Accordingly, the present invention is directed to a head mount display and a method for controlling the same that substantially obviate one or more problems due to limitations and disadvantages of the related art.

An object of the present invention is to provide a method for, when personal data is to be displayed on an external device, displaying the personal data on a Head Mount Display (HMD) to prevent exposure of the personal data to people around a user.

Another object of the present invention is to provide a method for displaying on an HMD only a component requiring protection in content displayed on an external device.

Another object of the present invention is to provide a method for displaying data requiring protection from an external device on an HMD, while applying a protection layer to the data on the external device so that the data cannot be viewed.

A further object of the present invention is to provide a tactile feedback in regard to a component to which a protection layer is applied for data protection in an external device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling an HMD includes detecting an external device in an image captured by the HMD, recognizing at least one component from a first User Interface (UI) of the external device, the at least one component including a keypad or a window for outputting data corresponding to an input signal to the keypad, generating a second UI including the recognized at least one component, displaying the second UI in the HMD, wherein the at least one component of the first UI being displayed on the external device is overlaid with the displayed second UI using the image from which the external device is detected, and displaying data corresponding to an input signal currently received at the external device on the second UI in the HMD.

In another aspect of the present invention, an HMD includes a processor configured to control an operation of the HMD, a display unit for outputting an image, a communication unit configured to transmit and receive data to and from an external device, and a sensor unit configured to capture an image and provide the captured image to the processor. The processor is configured to detect an external device in an image captured by the HMD, recognize at least one component from a first UI of the external device, the at least one component including a keypad or a window for outputting data corresponding to an input signal to the keypad, generate a second UI including the recognized at least one component, display the second UI so that the at least one component of the first UI being displayed on the external device is overlaid with the displayed second UI, and display data corresponding to an input signal currently received at the external device on the second UI.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 illustrates an embodiment of displaying components of which the layouts have been adjusted on the HMD according to a user's grips according to the present invention;

FIG. 10 illustrates an embodiment of controlling a display property of a protection layer in the external device according to the present invention;

FIG. 12 illustrates another embodiment of the external device being a digital door lock according to the present invention;

DETAILED DESCRIPTION OF THE INVENTION

Although the terms used in the present invention are selected from generally known and used terms, the terms may be changed according to the intention of an operator, customs, or the advent of new technology. Some of the terms mentioned in the description of the present invention have been selected by the applicant at his or her discretion, the detailed meanings of which are described in relevant parts of the description herein. Therefore, the present invention must be understood, not simply by the actual terms used but by the meanings of each term lying within.

The embodiments of the present invention will be described in detail with reference to the attached drawings and a description in the attached drawings, which should not be construed as limiting the present invention.

Figure 1:
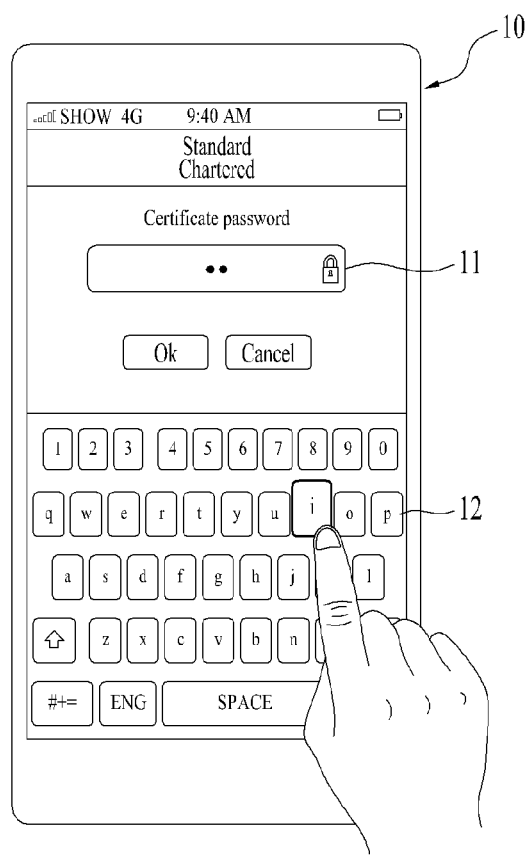
FIG. 1 illustrates an example of banking service in a conventional portable device.
Figure 2:
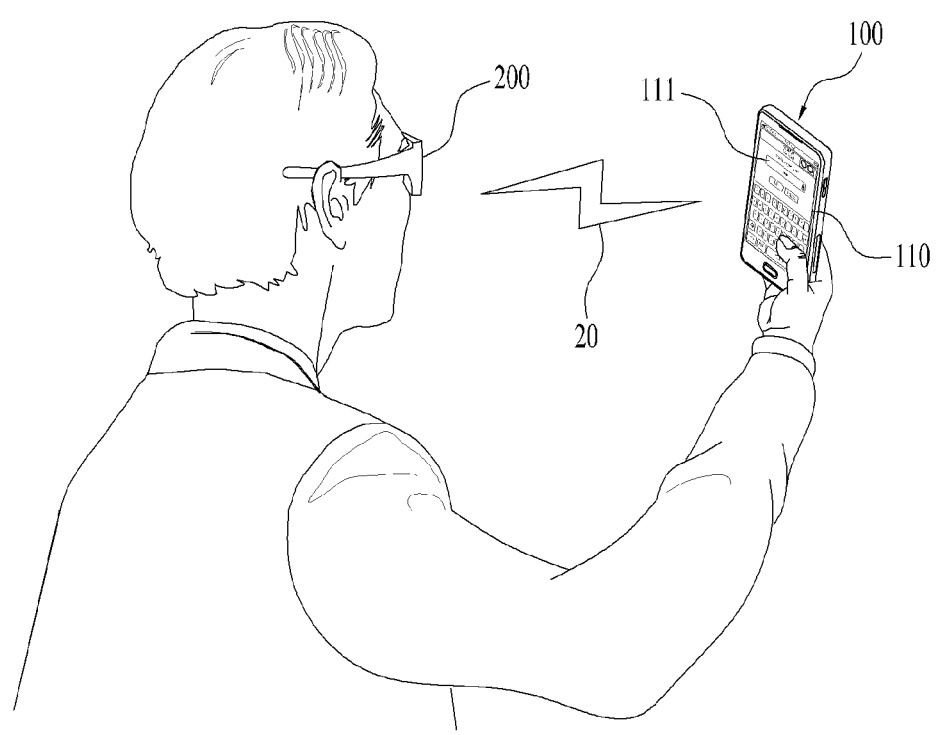
FIG. 2 illustrates a Head Mount Display (HMD), a user wearing the HMD, and an external device interacting with the HMD according to an embodiment of the present invention.

FIG. 2 illustrates a Head Mount Display (HMD), a user wearing the HMD, and an external device interacting with the HMD according to an embodiment of the present invention.

An external device 100 according to the present invention may output various types of content 111. For example, the external device 100 may output a variety of multimedia content including live broadcasting, movies, music, soap operas, Web pages, games, applications, etc.

The external device 100 includes at least one display unit 110 for displaying the content 111 output from the external device 100.

The external device 100 may further include a communication unit (not shown) for transmitting data to or receiving data from an HMD 200 and other devices.

When content displayed on the external device 100 needs protection, the displayed content may be wholly or partially transmitted to the HMD 200 according to the present invention. That is, if a UI displayed on the external device 100 includes a predetermined component, the external device 100 may transmit necessary data to the HMD 200 so that the entire UI or the component included in the UI can be displayed on the HMD 200, which will be described later with reference to FIGS. 4 to 7.

Accordingly, the external device 100 may be any of various devices each including a display unit and a communication unit in the present invention. For example, the external device 100 is useful, especially when it is a portable device capable of displaying data and communicating with other devices, such as a Personal Digital Assistant (PDA), a laptop computer, a tablet PC, or the like, because privacy protection is often required for, for example, personal information when the portable device is used outdoors. This will be described in greater detail with reference to FIG. 4.

The HMD 200 illustrated in FIG. 2 may operate in interaction with the external device 100. For interaction, the HMD 200 may be paired with the external device 100 or establish a communication connection with the external device 100. The pairing or the communication connection establishment may be performed in response to a user input through the HMD 200 or the external device 100.

For example, the HMD 200 may provide a button or UI for pairing with the external device 100 or establishing a communication connection with the external device 100. In addition, a user may pair the HMD 200 with the external device 100 or establish a communication connection between the HMD 200 and the external device 100 using the button or the UI.

Once the HMD 200 is paired with the external device 100 or establishes a communication connection with the external device 100, data to be protected from the external device 100 may be displayed on the HMD 200.

A network 20 may be any of various wired or wireless networks that enable communication between the HMD 200 and the external device 100 in the present invention. The available networks may operate in conformance to Near Field Communication (NFC), infrared communication, Bluetooth, Wireless Fidelity (WiFi), etc. However, the present invention is not limited to a specific network.

In the present invention, the HMD 200 may communicate with the external device 100 through one or a combination of the afore-described networks.

Figure 3:
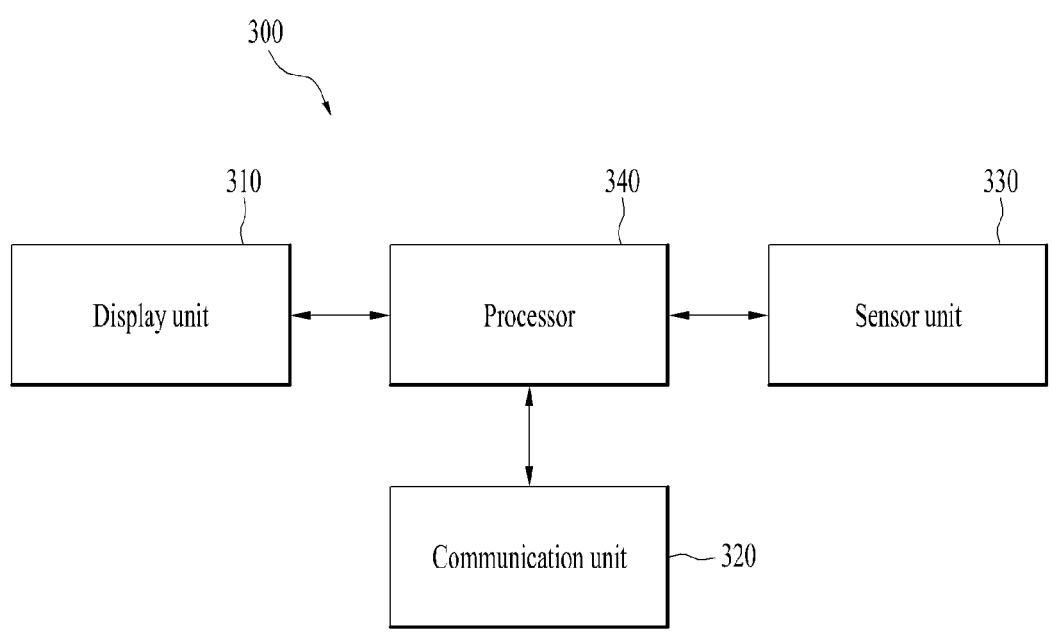
FIG. 3 is a functional block diagram of the HMD according to an embodiment of the present invention.

FIG. 3 is a functional block diagram of the HMD according to an embodiment of the present invention. The configuration of the HMD illustrated in FIG. 3 is a mere embodiment of the present invention and thus a component may be removed from or added to the HMD within the scope of the present invention.

Referring to FIG. 3, an HMD 300 according to an embodiment of the present invention may include a display unit 310, a communication unit 320, a sensor unit 330, and a processor 340.

The display unit 310 displays an image on a screen. The display unit 310 may output an image based on content executed in the processor 340 or according to a control command received from the processor 340.

In accordance with an embodiment of the present invention, the display unit 310 may also display an image according to a control command received from an external device (e.g. a portable device) interacting with the HMD 300.

For example, the display unit 310 may display content being executed in the external device interacting with the HMD 300. The content includes a UI displayed by executing a Web page or an application as well as a picture or a video. The content may include any data displayed to execute a specific function in the present invention. The HMD 300 may receive data from the external device through the communication unit 320 and output an image based on the received data.

The communication unit 320 may transmit or receive data by communicating with the external device based on various protocols. In addition, the communication unit 320 may access a wired or wireless network and transmit or receive data such as content through the network.

The HMD 300 may be paired or establish a communication connection with the external device through the communication unit 320 and thus may transmit data to or receive data from the connected external device in the present invention. The communication unit 320 may access a wired or wireless network and thus may transmit and receive digital data such as content, graphic data of a UI, and a control command.

Therefore, the HMD 300 of the present invention may receive data requiring privacy protection from the external device through the communication unit 320 and display the received data on the display unit 310 in such a manner that only the user can view the data.

The sensor unit 330 may transmit a user input or information about a HMD-perceived environment to the processor 340, using a plurality of sensors mounted to the HMD 300. The sensor unit 330 may include a plurality of sensors.

The plurality of sensors may include a gravity sensor, a geomagnetic sensor, a motion sensor, a gyro sensor, an acceleration sensor, an infrared sensor, an inclination sensor, an ambient light sensor, an altitude sensor, an odor sensor, a temperature sensor, a depth sensor, a pressure sensor, a bending sensor, an audio sensor, a video sensor, a Global Positioning System (GPS) sensor, a touch sensor, etc. These sensors may be included as separate elements in the HMD 300 or incorporated into at least one element in the HMD 300.

As described above, the sensor unit 330 refers to a set of various sensors. The sensor unit 330 may sense a user's various environments and provide the sensed result to the processor 340 so that the processor 340 may perform an operation corresponding to the sensed result.

The present invention is intended to provide an environment in which a user can view data requiring privacy protection on an HMD, when the data is displayed on an external device. Especially in an embodiment of the present invention, data displayed on the external device and data displayed on the HMD may be combined into complete data to the eyes of the user. Thus the user acquires complete information.

Accordingly, the sensor unit 330 may include a capturing sensor (not shown). The capturing sensor may capture an image. In other words, the capturing sensor may detect an image in a predetermined area corresponding to the field of the vision of the user wearing the HMD 300 and provide the detected image to the processor 340.

The processor 340 may determine whether an external device exists in the predetermined area corresponding to the field of the vision of the user wearing the HMD 340, based on the image detected by the capturing sensor. Upon detection of the presence of an external device, the processor 340 may receive data requiring privacy protection from the external device and display the data.

In addition, the processor 340 may recognize a component of a UI displayed on the external device in the image detected by the capturing sensor. That is, the processor 340 may recognize a component of a UI included in the detected image by image processing or the like. This will be described later with reference to FIGS. 6 and 7.

Whether data requires privacy protection or whether the external device is to transmit data to the HMD may be determined in a different manner according to a predetermined condition, which will be described with reference to FIG. 4.

The processor 340 may process data within the HDM 300, control each unit of the HMD 300, and control data transmission and reception between units of the HDM 300.

While not shown in FIG. 3, the HDM 300 may include a storage unit, an audio Input/Output (I/O) unit, or a power unit.

The storage unit (not shown) may store various digital data like an audio, a photo, a video, and an application. The storage unit refers to a variety of digital data storage spaces such as a flash memory, a Random Access Memory (RAM), a Solid State Drive (SSD), etc.

The storage unit may temporarily store data received from the external device through the communication unit 320. The storage unit may be used for buffering data or content received from the external device and outputting the buffered data or content through the HMD 300. In the present invention, it is optional to include the storage unit in the HMD 300.

The audio output unit (not shown) includes audio output means such as a speaker, an earphone, etc. In addition, the audio output unit may output voice based on content executed in the processor 340 or in response to a control command received from the processor 340. In the present invention, it is optional to include the audio output unit in the HMD 300.

The power unit is a power source connected to an internal battery or an external power source, for supplying power to the HMD 300.

The block diagram of the HMD 300 illustrated in FIG. 3 is purely exemplary. Blocks shown in FIG. 3 as separately configured are logically separated elements. Accordingly, the above-described elements may be installed on one or more chips depending on a device design.

The present invention provides a method for, when a user displays information requiring privacy protection on an external device, displaying the information on an HMD in such a manner that the information is not exposed to the outside. This method will be described below with reference to FIGS. 4 to 7.

Figure 4:
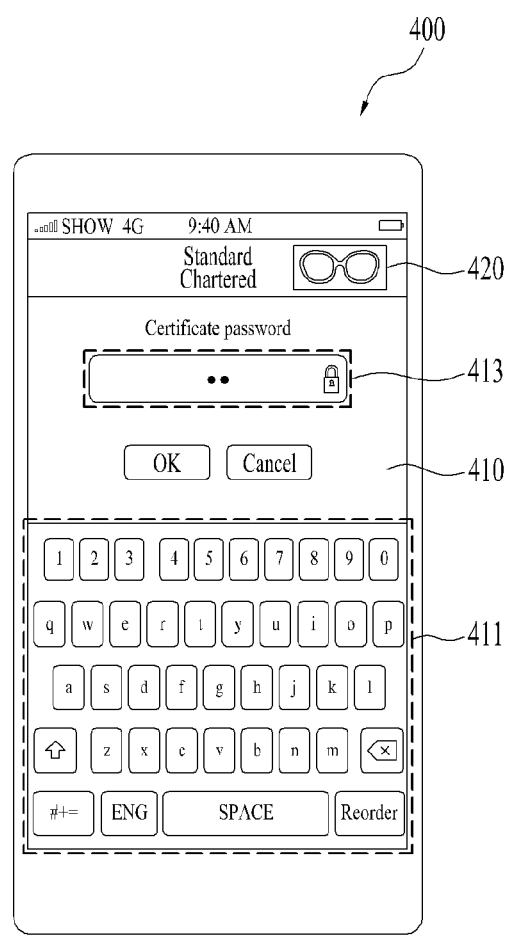
FIG. 4 illustrates an embodiment of displaying a User Interface (UI) on the external device according to the present invention.

FIG. 4 illustrates an embodiment of displaying a UI on the external device according to the present invention.

The HMD may detect the presence or absence of an external device interacting with the HMD in a predetermined area corresponding to the field of the vision of a user wearing the HMD using an image captured by the sensor unit. That is, the HMD may detect an image of a predetermined external device in a captured image by image processing or the like.

Besides, the HMD may detect the external device interacting with the HMD using position information about the HMD and position information about the external device or by the infrared sensor of the HMD.

A detected external device 400 may display a UI 410. The UI 410 is an interface provided to the user, in relation to an application, Web page, etc. being executed in the external device 400.

The UI 400 may include at least one component. As illustrated in FIG. 4, the at least one component may include a keypad 411 and a window 413 for outputting data corresponding to an input signal to the keypad 411.

When data requiring security such as a user Identifier (ID), a password, etc. is displayed on the UI 410 in the external device 400, there is a risk of exposing the data to the outside during inputting the data. In other words, despite security processing for the window 413, input data may be exposed to people around the user while the user is inputting data to the keypad 411 and thus the user risks data exposure.

In this context, normal mode and protection mode are defined for an external device and if the external device is placed in the protection mode, data requiring security is displayed only on the HMD in the present invention. Mode switching may be performed for the external device in various manners. An embodiment of switching the mode of an external device will first be described below.

In accordance with an embodiment of the present invention, the external device displays a mode switching icon 420 so that its mode may be switched according to a user input. That is, upon receipt of a user input requesting data protection from the user, for example, upon touch of the icon 420, the external device may switch to the protection mode.

In another embodiment of the present invention, the external device may extract attribute information about content being displayed on the external device and may switch to another mode according to the extracted attribute information. The content may include any data displayable on the external device as well as a photo and a video. The attribute information about the content may be pre-stored in the storage unit of the external device. Further, the attribute information about the content may include information indicating whether data protection is needed. This attribute information may be set by the user.

For example, if user confirmation or user authentication is needed for content such as a Web page requiring membership or log-in, an application requiring user confirmation, or image data in locked state, data protection may be set beforehand in the attribute information and stored along with the type of the content. Thus, the external device may switch its mode based on attribute information about content, referring to the storage unit, while executing the content.

In another embodiment of the present invention, when the external device displays a preset UI, the external device may switch from the normal mode to the protection mode. The preset UI includes at least one component of a keypad, a window that outputs data corresponding to an input signal to the keypad, and a window that outputs a user's personal information.

In this manner, the external device may switch from the normal mode to the protection mode, simultaneously with displaying a preset UI. In addition, the external device may indicate that it is operating in the protection mode by means of a protection mode icon 420 illustrated in FIG. 4.

As described above, the external device may switch from one mode to another according to a predetermined condition. However, if the external device has been paired with the HMD, the HMD may control mode switching of the external device according to the predetermined condition. Therefore, either the external device or the HMD may be responsible for switching the mode of the external device in the above embodiments of the present invention.

In a further embodiment of the present invention, the HMD may determine whether the user is wearing the HMD. Upon detection of the user's wearing of the HMD, the HMD may switch the external device from the normal mode to the protection mode. The HMD may determine whether the user is wearing the HMD through the sensor unit including the touch sensor, the capturing sensor, etc. The user's wearing of the HMD may imply that the user intends to view personal information through the HMD and thus the HMD may switch the external device to the protection mode.

Instead of controlling mode switching for the external device, the HMD may transmit a signal requesting switching to the protection mode to the external device so that the external device may switch to the protection mode.

The external device may switch its mode in various manners, not limited to the above-described embodiments. As described before, the entity responsible for switching the mode of the external device may be the external device or the HMD.

When the external device switches from the normal mode to the protection mode, the HMD may recognize at least one component in a UI displayed on the external device. The HMD may also generate a UI including the recognized at least one component and display the UI. For convenience' sake of description, the UI provided by the external device and the UI provided by the HMD will be referred to as first and second UIs, respectively.

Figure 5:
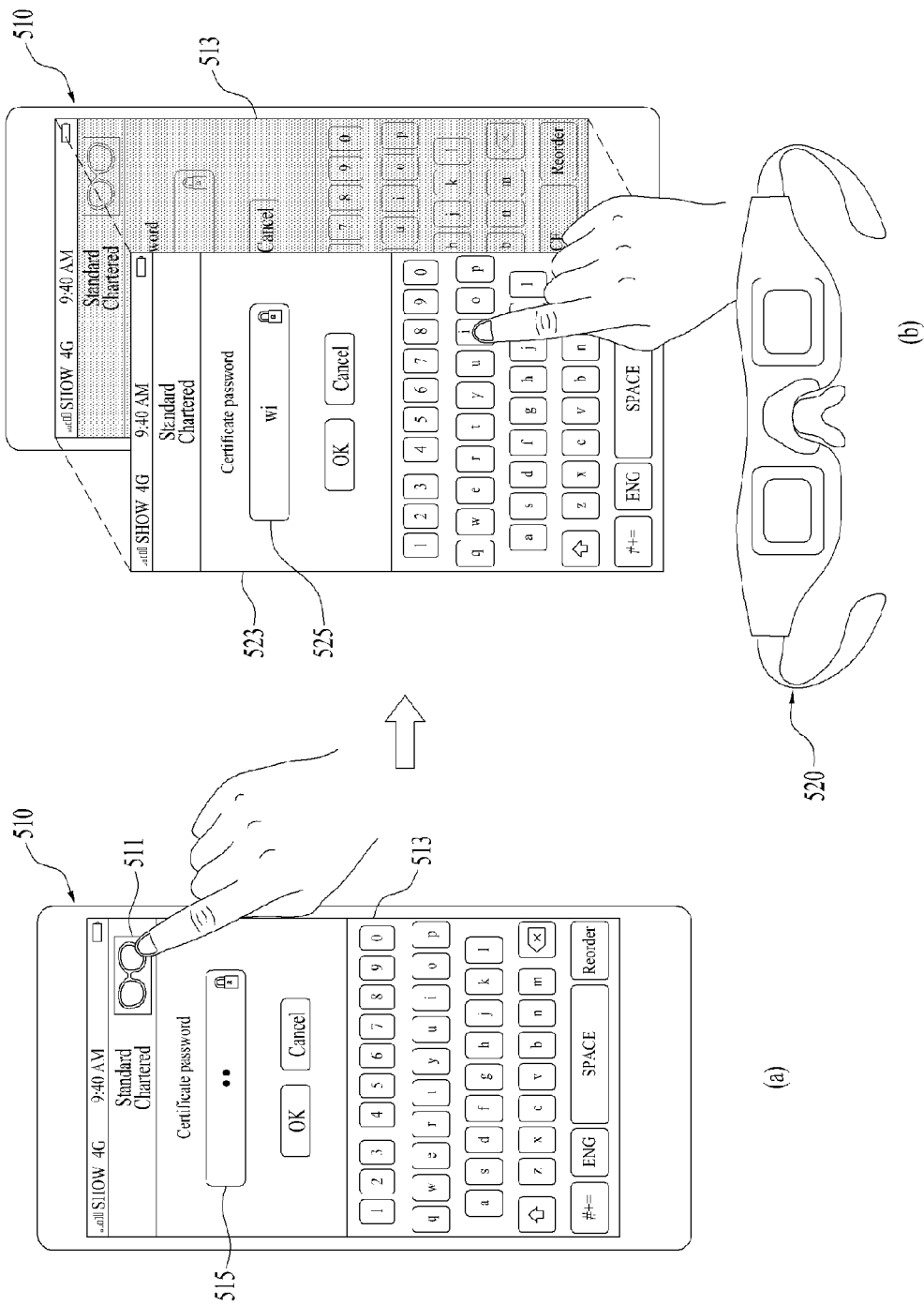
FIG. 5 illustrates an embodiment of displaying UIs on the HMD and the external device according to the present invention.

FIG. 5 illustrates an embodiment of displaying UIs on the HMD and the external device according to the present invention. In the embodiment of the present invention, the entire first UI displayed on the external device is displayed as the second UI on the HMD.

Referring to FIG. 5(*a*), upon receipt of a user input to a preset icon 511, an external device 510 may switch to the protection mode. When the external device 510 switches from the normal mode to the protection mode, an HMD 520 may receive data related to a first UI 513 from the external device 510, generate a second UI 523 identical to the first UI 513, and display the second UI 523.

The HMD 520 may receive data needed to generate the second UI 523 from the external device 510 and generate the second UI 523 based on the received data. Alternatively or additionally, the HMD 520 may generate the second UI 523 by recognizing the display unit or screen of the external device 510 from an image of the external device 510 captured by the sensor unit and using an image displayed on the display unit or screen or editing the image.

Therefore, the user may view the UI 523 identical to the UI 513 provided by the external device 510 on the HMD 520.

Notably, upon receipt of an input signal to a keypad, a window 515 being one of the components included in the first UI 513 may represent the state of the input. When the external device 510 displays data corresponding to the input signal on the window 515, the data may be exposed to other people around the external device 510. Therefore, the external device 510 subjects data displayed on the window 515 to security processing so that only the input state is displayed on the window 515 and thus other people around the external device 510 may not view the contents of the data.

On the other hand, since only the user wearing the HMD 520 can view a component 525 included in the second UI 523, that is, a window 525 on which data corresponding to an input to the keypad is output, the data is not subjected to security processing and thus the input state and input data can be displayed.

The user can view all necessary data on the second UI 523. Therefore, the external device 510 may display a protection layer over the displayed area of the first UI 513 to prevent information exposure to people around the external device 510. The protection layer is a layer displayed over the first UI 513, which makes data displayed on the first UI 513 unseen or unidentifiable. This will be described with reference to FIGS. 8, 9 and 10.

Figure 6:
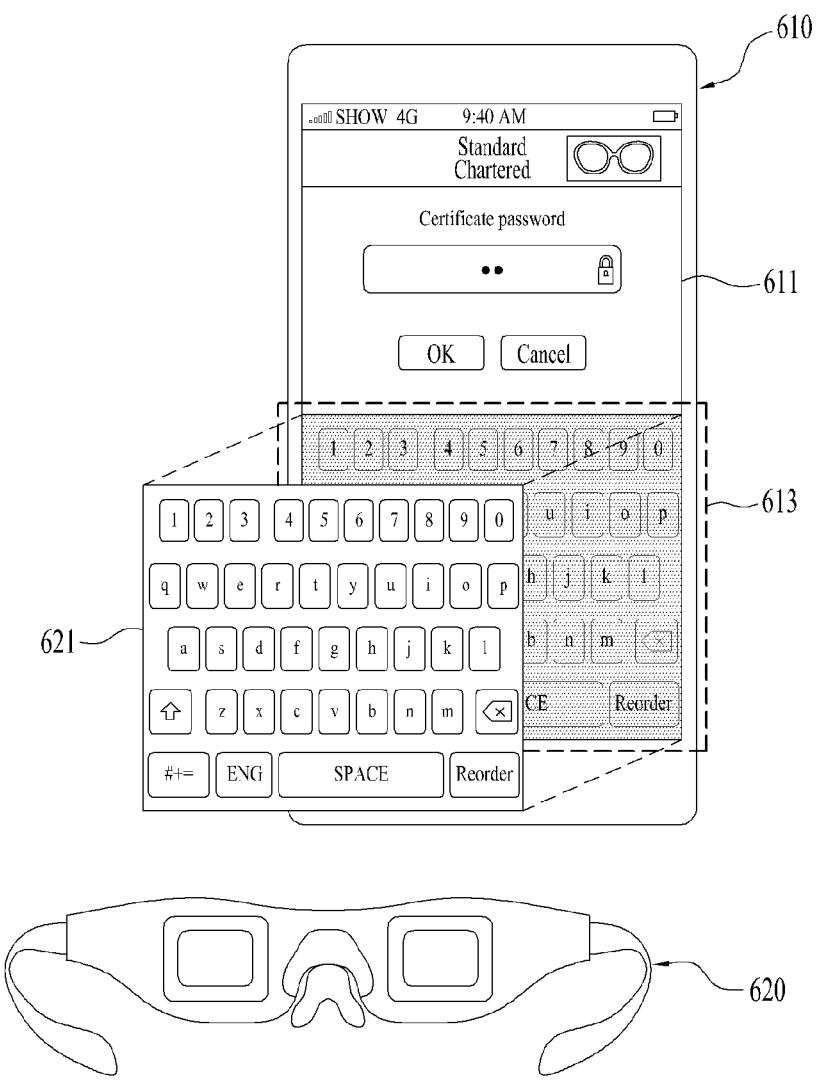
FIG. 6 illustrates another embodiment of displaying UIs on the HMD and the external device according to the present invention.

FIG. 6 illustrates another embodiment of displaying UIs on the HMD and the external device according to the present invention. The second UI of the HMD is the same as the first UI of the external device in the afore-described embodiment of the present invention. In this embodiment, the second UI of the HMD includes only a part of the components of the first UI of the external device.

Referring to FIG. 6, a first UI 611 provided by an external device 610 may include at least one component. An HMD 620 can recognize only a certain component in the first UI 611. The recognized component may include a keypad 613 or a window that outputs data corresponding to an input signal to the keypad 613. As illustrated in FIG. 6, the HMD 620 recognizes the keypad 613 in the first UI and generates a second UI 621 with the recognized keypad 613.

Now a description will be given of an embodiment of recognizing a component of the first UI 611 in the HMD 620. The external device 610 may store data related to at least one component included in the first UI 611 in the storage unit or receive the data from an external server. The external device 610 may transmit the stored or received data related to the at least one component to the HMD 620. Then the HMD 620 may recognize a component from the receive data.

Another embodiment of recognizing a component in the first UI 611 in the HMD 620 will be described below. The HMD 620 may recognize a component in an image captured to detect the external device 610. In other words, the HMD 620 may separate an image displayed on the display unit of the external device 610 from a captured image of the external device 610 by, for example, scissoring and may recognize the type of a component in the first UI in the separated image.

The HMD 620 may generate the second UI 621 with a pre-stored component corresponding to the recognized component. Or the HMD 620 may generate the second UI 621 by using or editing the image of the recognized component.

The HMD 620 may display the second UI 621 so that the second UI 621 is laid over the first UI 611 being displayed on the external device 610.

That is, the HMD 620 may recognize the display unit (or screen) of the external device 610 using an image captured to detect the external device 610. Therefore, the HMD 620 may display the second UI 621 so that the component 613 of the first UI 611 is overlaid with a component included in the second UI 621.

The HMD 620 may consider the pupil size of the user, the eye relief of an optical system with which the second UI 621 is seen, a magnification, and a Field Of View (FOV) in laying the second UI 621 over the first UI 611.

Therefore, the user may perceive a whole image in which the second UI 621 is combined with the first UI 611, as one interface.

In addition, the external device 610 may display a protection layer on the component 613 of the first UI 611 overlaid with the second UI 621. The use of the protection layer advantageously reduces the risk of exposure of data output on the external device 610 to people around the user. This will be described later in greater detail with reference to FIGS. 8, 9 and 10.

Figure 7:
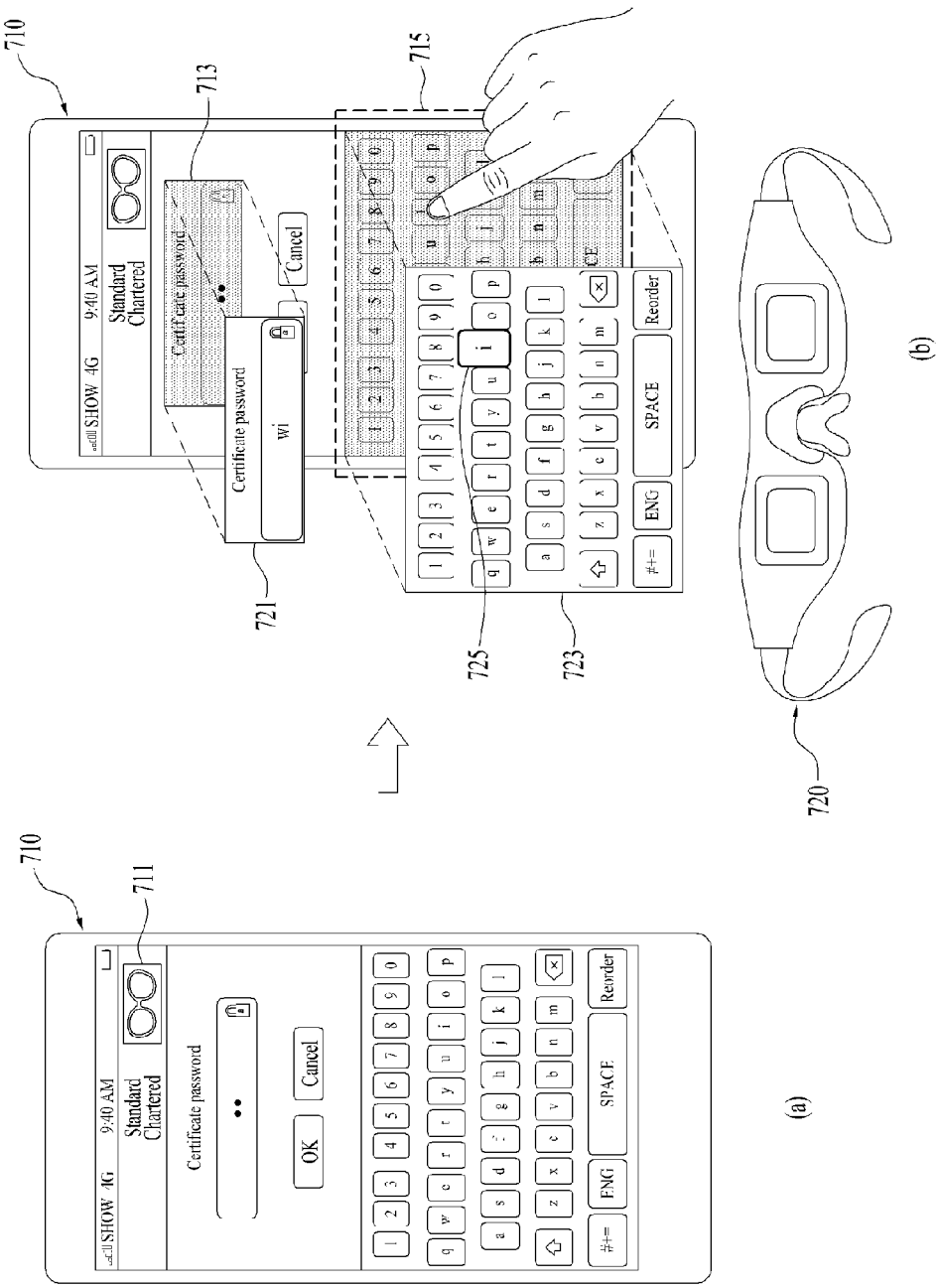
FIG. 7 illustrates a further embodiment of displaying UIs on the HMD and the external device according to the present invention.

FIG. 7 illustrates a third embodiment of displaying UIs on the HMD and the external device according to the present invention. While only one component is recognized in the first UI and the second UI is generated with the recognized component in the second embodiment of the present invention, the second UI is generated with a plurality of components included in the first UI in the third embodiment of the present invention.

Referring to FIG. 7(a), upon receipt of a user input signal to a preset icon 711, an external device 710 may switch from the normal mode to the protection mode. As described before, the external device may be switched from the normal mode to the protection mode by a trigger other than the user input.

When the external device 710 switches to the protection mode, an HMD 720 may recognize at least one component. The HMD 720 may recognize the at least one component in various manners, for example, by receiving data related to components from the external device or processing a captured image. The number of recognized components is not limited. As illustrated in FIG. 7(b), the HMD 720 may recognize a plurality of components.

In FIG. 7(b), a first UI includes a keypad 715 and a window 713 for outputting data corresponding to an input signal to the keypad 715, as components. Thus, a second UI may include a keypad 723 and a window 721 for outputting data corresponding to an input signal to the keypad 721.

One thing to note herein is that the external device 710 may display protection layers over the components 713 and 715 of the first UI overlaid with the second UI. Accordingly, the user cannot view data in the displayed areas of the protection layers. Hence, the user may view a complete UI only when the user sees the first and second UIs simultaneously, wearing the HMD 720.

Even though other people are around the user, no data leaks from the external device. Furthermore, because the second UI lies over components of the first UI, the user can readily see the one complete UI without any special efforts, simply by seeing the first and second UIs at the same time.

Meanwhile, the HMD 720 may display data corresponding to an input signal currently received at the external device, on a second user authentication interface.

A user's touch input may be received through the first UI of the external device. In contrast, the second UI cannot receive a user's touch input because it is a virtual interface displayed through the HMD 720.

In this context, the external device 710 receives a user's touch input on the first UI and the HMD 720 provides a feedback to the user's touch input on the second UI according to the present invention.

In FIG. 7(b), when the user touches a specific key on the keypad 715 of the external device 710, the HMD 720 may display a touched key 725 on the second UI, as a feedback indicating the touched key.

Herein, the HMD 720 may receive data corresponding to the user's touch input from the external device 710 and display the touched key 725 as a specific key corresponding to the received data. Or the HMD 720 may determine the position of the user's touch input through the sensor unit and display the touched key 725 by recognizing the key corresponding to the determined position in the second UI. The HMD 720 may recognize the key selected by the user's touch input from an image received from the external device 710 or an image captured to detect the external device 710. The present invention is not limited to the specific methods. Rather, the selected key may be recognized in other various manners.

Meanwhile, the external device 710 may display protection layers over components of the first UI overlaid with the second UI. The protection layers are layers displayed over the first UI to make it difficult for people around the external device to see data displayed on the first UI. Thus, the displayed areas of the protection layers may be perceived as dark screens to the user and other people.

If a protection layer is displayed on the first UI, a problem may occur when a user's touch input is received on the first UI.

For example, if a component over which a protection layer is displayed is a keypad, the user should be able to confirm a touched key in order to input an intended key correctly. However, when the user touches the first UI, the user may have difficulty in finding an intended key, viewing the second UI.

That is, while the user's touch input is received on the first UI, the user may confirm the input key on the second UI 723. Due to the difference between the input interface (the first UI) and the interface displayed for inputting (the second UI), the user may feel difficulty in applying a touch input.

Therefore, when the external device displays a protection layer, the protection layer may be displayed in various manners in order to facilitate a user's touch input in the present invention, which will be described in detail with reference to FIG. 8.

Figure 8:
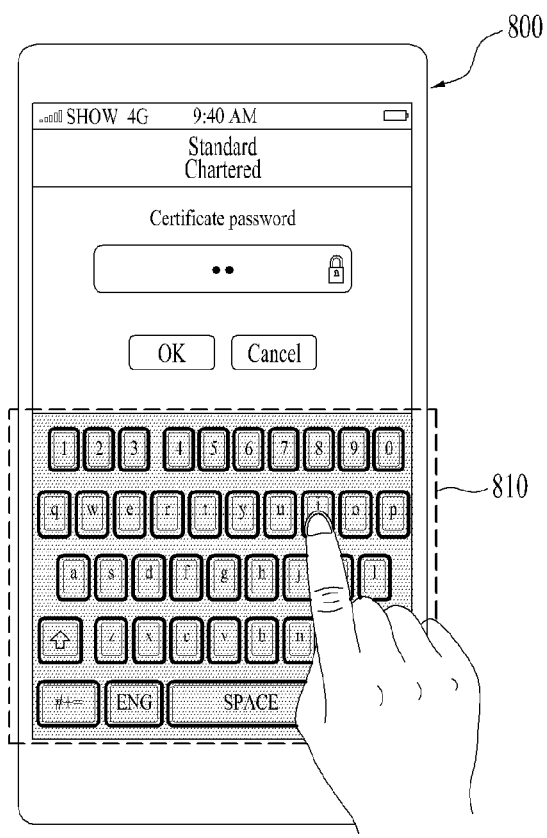
FIG. 8 illustrates an embodiment of displaying a protection layer over a component of a UI in the external device according to the present invention.

FIG. 8 illustrates an embodiment of displaying a protection layer over a component of a UI in the external device according to the present invention. It is assumed that a keypad is recognized as a component of the first UI in an external device 800 and a second UI is generated with the recognized keypad.

As described before, the external device 800 may display a protection layer 810 over a component of a first UI overlaid with a second UI. If the component of the second UI includes a keypad, the protection layer 810 may include the outline of the first UI.

Therefore, although the user cannot identify a specific key on the keypad of the first UI, the user can easily find the specific key overlaid with the second UI based on the outline. When the protection layer of the first UI includes the outline, the HMD may be highly utilized by rendering the second UI more transparent. That is, if the second UI gets more transparent, the user may see a matching outline and his or her hand that inputs a specific key and thus easily input the specific key.

As the protection layer 810 provides the outline of the keypad, the user can easily identify a specific key from other keys, when touching the specific key on the first UI, viewing the second UI.

When the second UI includes a keypad as a component, the first UI may provide a tactile feedback corresponding to a user's touch input to a component over which the protection layer 810 is displayed. Therefore, the external device may include a sensor unit for detecting a touch input and a tactile feedback unit for providing a tactile feedback corresponding to the touch input.

In the case where the external device receives a user's touch input and provides a tactile feedback corresponding to the touch input, the shape of the user's grip is important. Especially when the external device is a portable device such as a smart phone, it is difficult to control the portable device with one hand due to an increased display size. Consequently, the user may use the external device conveniently or inconveniently depending on the shape of a user's grip on the external device.

Therefore, when the components of the first UI in the external device include a keypad, the HMD may detect the shape of the user's grip on the external device from a captured image. In addition, the HMD may provide a preset component on the second UI according to the detected grip shape. The preset component may be a keypad of which the layout has been adjusted to facilitate the user's touch according to the detected grip shape. This will be described in detail with reference to FIG. 9.

FIG. 9 illustrates an embodiment of displaying a component of which the layout has been adjusted on the HMD according to a user's grip according to the present invention.

If components of the first UI recognized to generate the second UI include a keypad, an HMD 920 may detect the shape of the user's grip on an external device 910 from an image captured by the HMD 920, as described before.

The HMD 920 may store a keypad with a layout adjusted to increase user convenience according to the shape of the user's grip in the storage unit. Thus, the keypad with a preset layout according to the detected shape of the grip is generated as a component of a second UI 921. Therefore, the layout of the keypad included in the second UI 921 may be different from that of the keypad included in the first UI.

When the HMD 920 displays the second UI 921, the external device 910 may display a protection layer 911 over a component of the first UI overlaid with the second UI 921.

As illustrated in FIG. 9(a), the protection layer 911 may include the outlines of the keypad included in the second UI 921. That is, although the keypads included in the first and second UIs have different layouts, the user sees the second UI and thus the protection layer 911 may include an outline corresponding to the layout of the keypad included in the second UI 921.

Therefore, the outline of the keypad included in the protection layer 911 matches to that of the keypad displayed on the second UI 921. In addition, the component of the second UI 921 including the keypad may lie over the outline of the protection layer 911.

The external device 920 may provide a tactile feedback corresponding to a user's touch input to the protection layer 911 on the first UI. Since the protection layer 911 includes the keypad outline of the second UI adjusted according to the shape of a user's grip, the external device 910 may provide a tactile feedback adjusted according to the outline included in the protection layer 911.

Therefore, the user can feel the outline of the keypad from the tactile feedback and thus can touch keys easily.

The user touches the keypad of the first UI, viewing a keypad having a different layout. Therefore, a key input corresponding to the user's touch input may be identified from an image captured by the HMD or by receiving information about the position of the touch input from the external device and matching the position information to the keypad.

FIG. 9(a) illustrates a keypad with a layout adjusted according to the shape of a user's grip, as a component according to an embodiment of the present invention. FIG. 9(b) illustrates a call-related menu with a layout adjusted according to the shape of a user's grip, as a component according to an embodiment of the present invention. In the case where the HMD 920 displays a menu having at least one selection option for user inputs, as a component, the HMD 920 may change the layout of the menu according to the shape of a user's grip.

Therefore, when components of the first UI recognized to generate the second UI include a menu having at least one selection option, the HMD 920 may detect the shape of a user's grip on the external device 910 using a captured image.

The HMD 920 may store the menu having a layout adjusted to facilitate the user's use according to the shape of the user's grip in the storage unit, or may adjust the layout of the menu upon detection and generate the layout-adjusted menu as a component of the second UI 923.

When the HMD 920 displays the second UI 923, the external device 910 may display a protection layer 913 over the component of the first UI overlaid with the second UI 923. As illustrated in FIG. 9(b), the protection layer 913 may include the outline of a menu adjusted according to a detected grip shape.

Therefore, the outline of the menu included in the protection layer 913 matches to that of the menu displayed on the second UI 923. That is, the component including the menu of the second UI 923 may be laid over the outline included in the protection layer 913.

In addition, the external device 910 may provide a tactile feedback corresponding to a user's touch input to the protection layer 913 through the first UI. Since the protection layer 913 includes the outline of the menu adjusted according to the shape of the user's grip in the second UI 923, the external device 910 may provide a tactile feedback adjusted according to the outline included in the protection layer 913.

It has been described above according to an embodiment of the present invention that a protection layer displayed on an external device is a dark screen so that a user may not view data in the displayed area of the protection layer. Meanwhile, the user may want to see data on the external device, in spite of privacy protection required for the data. Accordingly, the present invention provides an external device that allows a user to control the display property of the protection layer.

FIG. 10 illustrates an embodiment of controlling the display property of a protection layer on the external device according to the present invention.

According to the present invention, the external device may provide the first UI with an interface for adjusting the display property of a protection layer according to a user's input regarding a component over which the protection layer is displayed.

Referring to FIG. 10(a), while displaying a protection layer 1013 taking the form of a dark screen, the first UI may provide an interface 1011 for allowing the user to adjust the transparency of the protection layer 1013. When the user manipulates the interface 1011 to adjust the transparency of the protection layer 1013, the external device may display a transparent protection layer 1023 as illustrated in FIG. 10(b).

While the display property of a protection layer is shown in FIG. 10 as transparency in accordance with the embodiment of the present invention, the display property may include at least one of chroma and transparency, not limited to transparency.

Meanwhile, the external device is not limited to a specific device in the present invention. Thus the external device may be any device, as far as it is provided with a display unit and connectable to an HMD through a network. However, if the external device is a specific device, its utilization increases, which will be described with reference to FIGS. 11 to 14.

Figure 11:
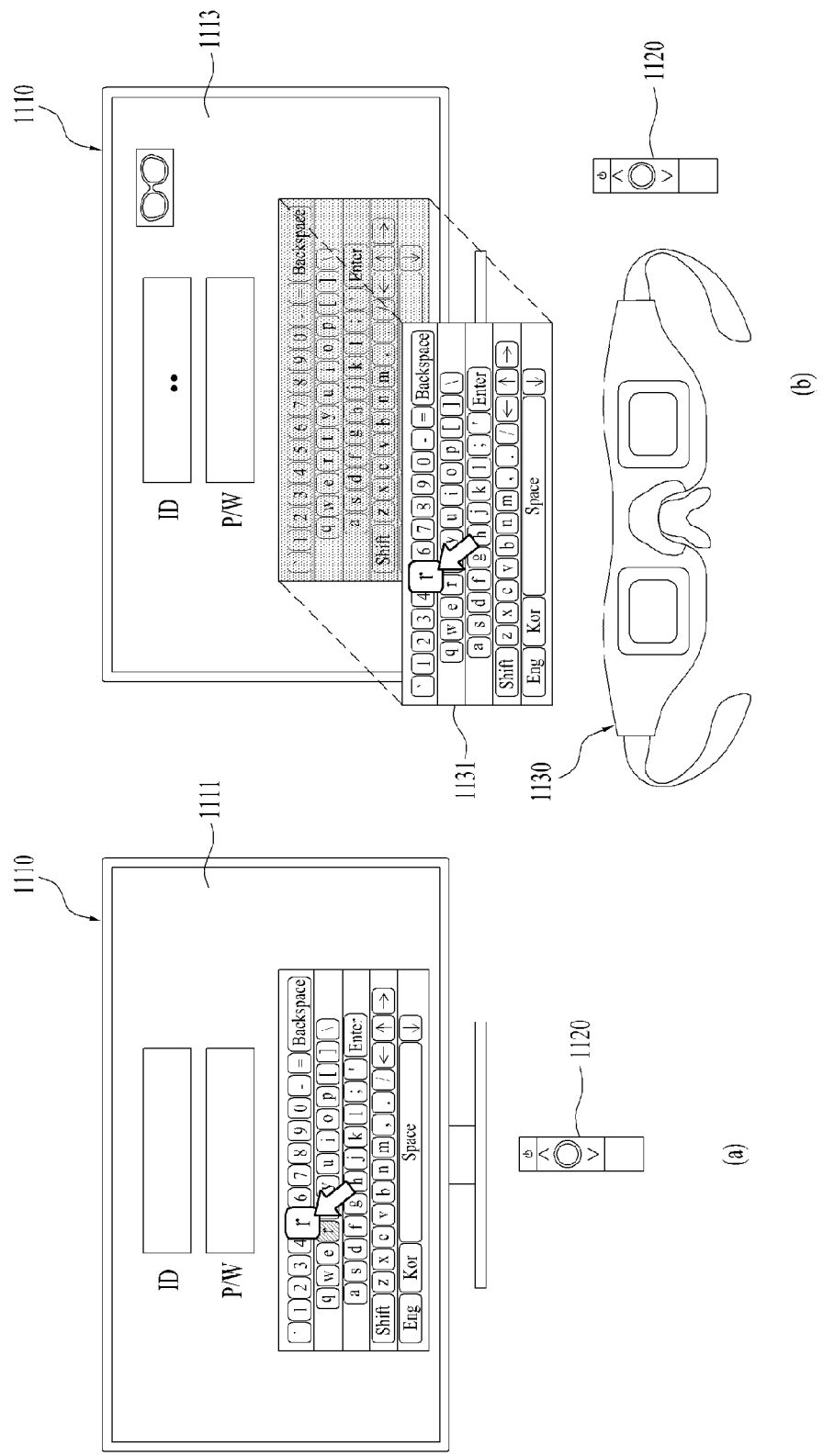
FIG. 11 illustrates an embodiment of the external device being a smart TV according to the present invention.

FIG. 11 illustrates an embodiment of the external device being a smart TV according to the present invention.

Along with the rapid growth of smart TVs, more and more users use smart TVs. Since smart TVs provide a variety of types of content in Video On Demand (VOD) as well as terrestrial broadcasting, user enjoy more and more paid content. As a consequence, a user should enter a user ID and a password in many cases, when the user is to view a smart TV 1110, as illustrated in FIG. 11 (a). When the smart TV 1110 provides a first UI 1111 for receiving the user ID and the password, the user may enter the user ID and the password using a remote controller 1120.

Despite an environment in which only a predetermined number of users use the smart TV 1110 within a limited space, content may be restricted only to specific users according to the type of the content. When needed, the user ID and password should be protected against exposure to nearby people. However, when the user enters the user ID and passwords using the remote controller 1120, specific input keys are displayed enlarged and thus the user ID and password are disclosed as illustrated in FIG. 11(a).

Therefore, an HMD 1130 of the present invention may recognize a component of the smart TV 1110 and provide the recognized component on a second UI 1131, as illustrated in FIG. 11(b). The second UI 1131 may be laid over the component of the first UI being displayed on the smart TV 1110. The smart TV 1110 may display a protection layer over the component of the first UI overlaid with the second UI 1131.

The smart TV 1110 may receive a user input through the remote controller 1120 and the HMD 1130 may additionally provide data corresponding to the current received input signal on the second UI 1131.

FIG. 12 illustrates another embodiment of the external device being a digital door lock according to the present invention.

A digital door lock 1210 illustrated in FIG. 12(a) has recently been popular in offices or apartments. When a preset password is input to a first UI 1211 of the digital door lock 1210, the digital door lock 1210 is released. However, since the digital door lock 1210 is exposed to the outside, the password is likely to be exposed to outsiders while a user is entering the password.

Therefore, an HMD 1220 recognizes a component for entering a password on the first UI 1211 and provides a second UI 1221 with the recognized component in the present invention. The digital door lock 1210 may display a protection layer 1213 on the first UI 1211.

As illustrated in FIG. 12(b), a keypad included in the second UI 1221 may be configured to have a different layout from that of a keypad included in the first UI 1211. Thus, even though an outsider sees the user entering the password, he or she cannot identify input keys. Therefore, the password is not exposed.

In addition, the protection layer 1213 displayed on the first UI 1211 may include the outline of the component. The first UI 1211 may further provide a tactile feedback corresponding to a user's touch input.

Figure 13:
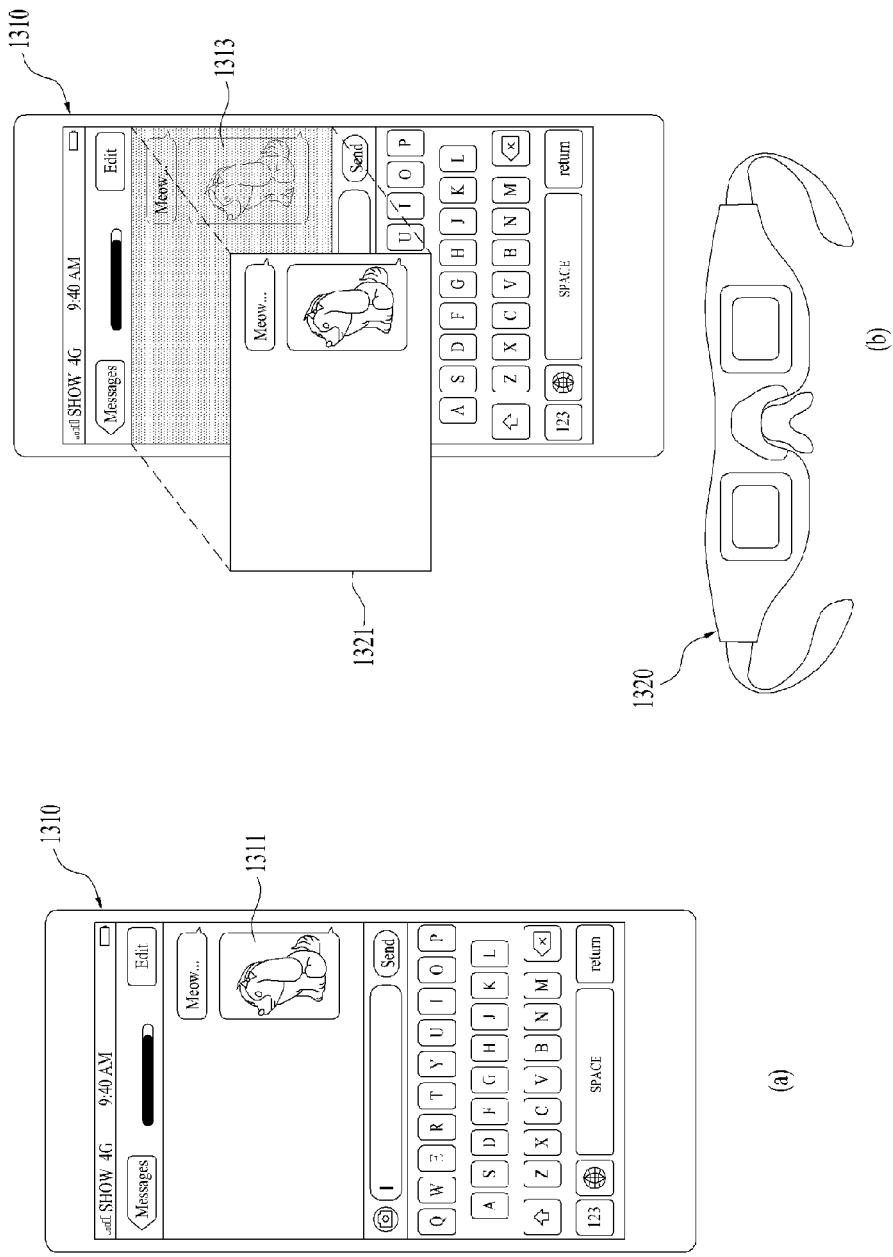
FIG. 13 illustrates another embodiment of the external device being a smart phone according to the present invention.

FIG. 13 illustrates another embodiment of the external device being a smart phone according to the present invention.

It has been described that the external device is a portable device and components recognized for generation of a second UI by the HMD are a keypad and a window for outputting data corresponding to an input to the keypad.

However, many other components than the keypad and the window may require data protection. Referring to FIG. 13(*a*), in the case where the portable device is a smart phone 1310, when messages are transmitted and received between users by Social Networking Service (SNS), the smart phone 1310 may provide a component 1311 that displays a message transmission and reception history. Since messages carry personal data in many cases, they often require privacy protection.

Therefore, an HMD 1320 may recognize the component 1311 for displaying a message transmission and reception history and provide the component 1311 on a second UI 1321. The smart phone 1310 may display a protection layer 1313 over the component 1311.

Therefore, the user may more conveniently transmit a message to or receive a message from another user without worrying about message leakage even in a public place. Further, the HMD and the external device can prevent data exposure to the outside, thereby enhancing security according to the present invention.

Figure 14:
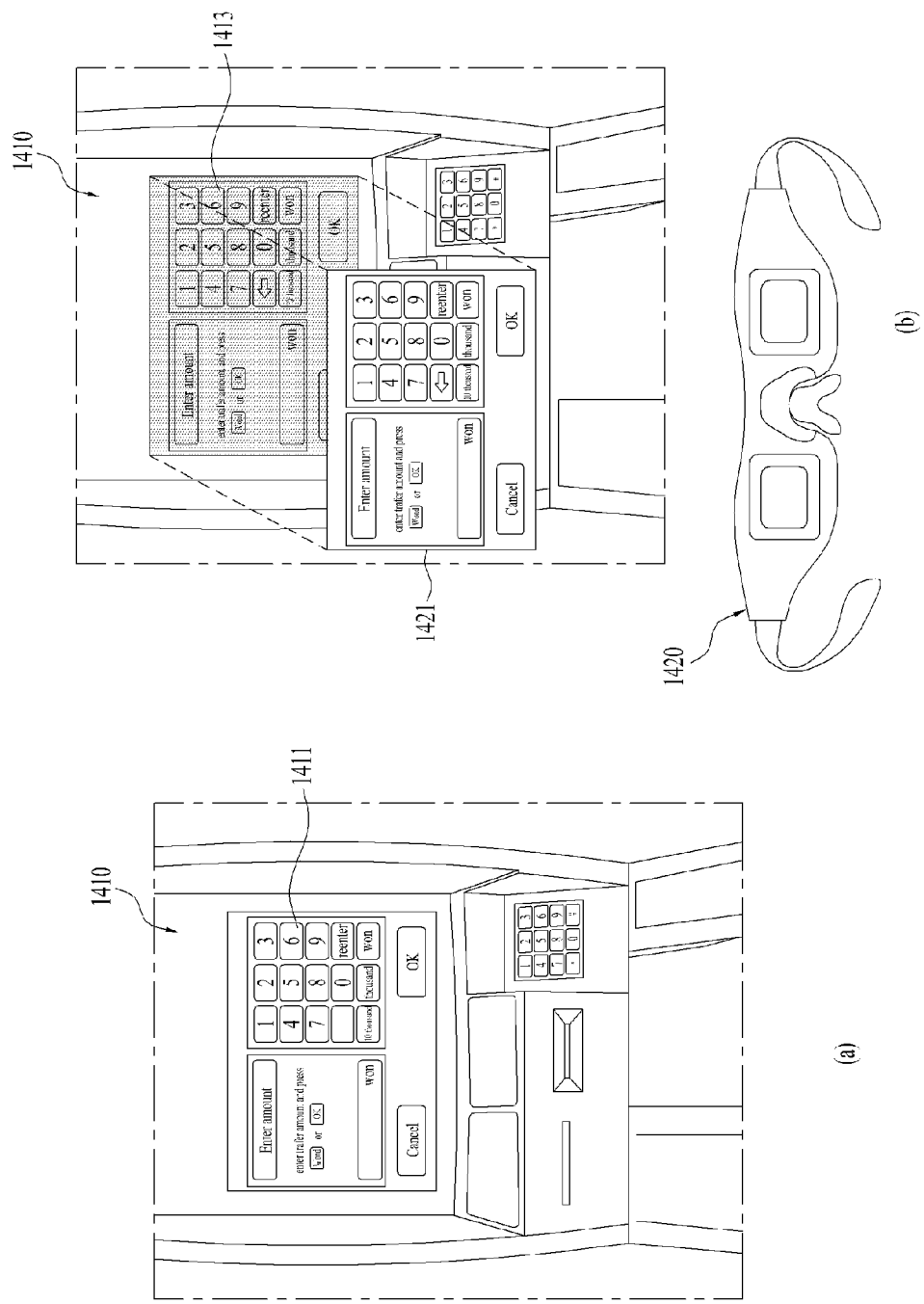
FIG. 14 illustrates a further embodiment of the external device being an Automated Teller Machine (ATM) according to the present invention.

FIG. 14 illustrates a further embodiment of the external device being an Automated Teller Machine (ATM) according to the present invention.

ATMs are installed in public places. Therefore, when a user enters the password of an account on a first UI 1411 of an ATM 1410, the user should always be careful lest the password should be exposed to a nearby person.

Accordingly, an HMD 1420 may recognize a component required for entering a password in the first UI 1411 and provide the recognized component in a second UI 1421. The second UI 1421 may be laid over the first UI 1411. Accordingly, the user may deal with an ATM, while viewing the first and second UIs 1411 and 1421. Therefore, user convenience can be increased.

Since the ATM 1410 receives a user input, the first UI 1411 may display a protection layer 1413 so that a nearby person cannot identify input data.

Figure 15:
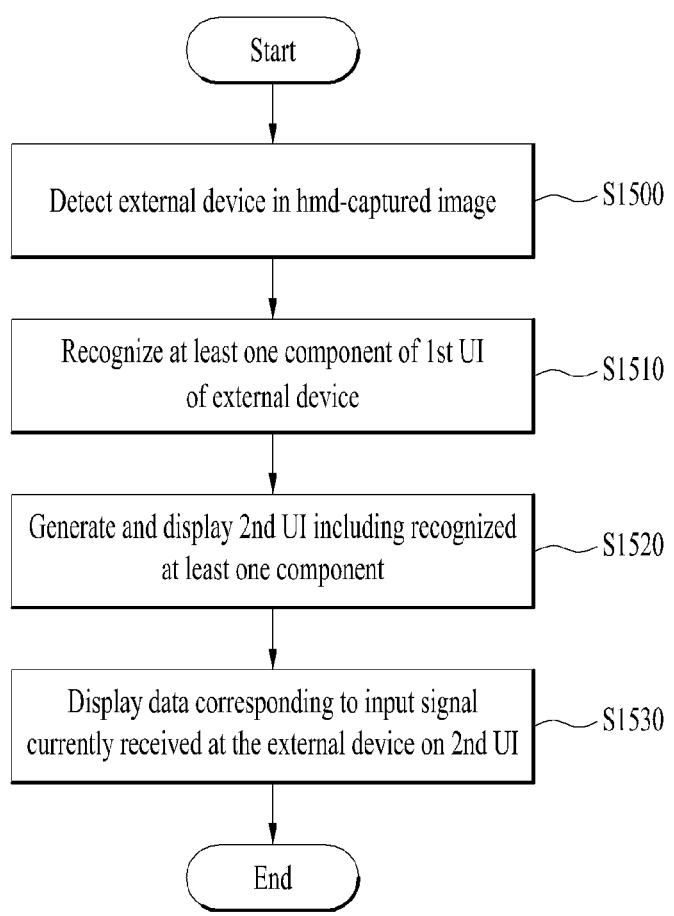
FIG. 15 is a flowchart illustrating a method for controlling the HMD according to an embodiment of the present invention.

FIG. 15 is a flowchart illustrating a method for controlling the HMD according to an embodiment of the present invention. With reference to FIG. 15, an embodiment of a method for controlling an HMD connected to an external device through a network in order to protect personal information will be described below.

Referring to FIG. 15, the HMD may detect the external device in an image captured by the sensor unit (S1500). The HMD may detect the external device by processing the captured image or using the position and direction of the HMD and the position of the external device. The external device is connected to the HMD through a network. The external device covers all possible devices that can display a first UI.

The HMD may recognize at least one component of the first UI of the external device (S1510). As described before with reference to FIG. 4, the at least one component may include at least one of a keypad, a window for outputting data corresponding to an input signal to the keypad, a user menu including at least one selection option, and a window for displaying preset data.

In addition, the HMD may recognize the at least one component of the first UI by the image processing and recognition method using an image captured by the HMD as described before with reference to FIG. 6, or using component information received from the external device.

As described before with reference to FIGS. 5, 6 and 7, the HMD may generate and display a second UI including the recognized at least one component (S1520). The displayed second UI may be laid over the first UI being displayed on the first UI, using the image from which the external device has been detected.

As described before with reference to FIG. 8, the external device may display a protection layer over the component of the first UI overlaid with the second UI. The first UI may include an interface for adjusting the display property of the protection layer according to a user input, as described before with reference to FIG. 10.

The HMD may display data corresponding to an input signal currently received at the external device on the second UI as described before with reference to FIG. 5 (S1530). Accordingly, the HMD and the external device interacting with the HMD over the network can reduce the risk of exposure of data input to the external device to nearby persons.

As is apparent from the above description, if an external device is supposed to display personal information, the personal information is displayed through an HMD, thereby preventing data leakage and enhancing security in accordance with an embodiment of the present invention.

In accordance with another embodiment of the present invention, only a component requiring privacy protection among components being displayed on the external device is displayed on the HMD. Therefore, user convenience can be increased.

In accordance with another embodiment of the present invention, a protection layer is provided to data displayed on the HMD for data protection so that the same data is not displayed on the external device. Therefore, a user is allowed to view data without interruptions, while data leakage through the external device is efficiently prevented.

In accordance with a further embodiment of the present invention, upon receipt of a user's touch input regarding a component for which a protection layer is provided on the external device, for data protection, the external device provides a tactile feedback, thereby increasing user convenience.

While the present invention has been described with reference to separate drawings for convenience's sake, a new embodiment may be implemented by embodiments described in the drawings. When needed, designing a recording medium readable by a computer to which a program for implementing the afore-described embodiments of the present invention is written may fall within the scope of the present invention.

The HMD and the method for controlling the same according to the foregoing exemplary embodiments are not restricted to the exemplary embodiments set forth herein. Therefore, variations and combinations of the exemplary embodiments set forth herein may fall within the scope of the present invention.

The method for controlling an HMD according to the foregoing exemplary embodiments may be implemented as code that can be written on a computer-readable recording medium and thus read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission over the Internet). The computer-readable recording medium can be distributed over a plurality of computer systems connected to a network so that computer-readable code is written thereto and executed therefrom in a decentralized manner. Programs, code, and code segments to realize the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A Head Mount Display (HIVID) comprising:
   a processor configured to control an operation of the HIVID;
   a display unit;
   a communication unit configured to communicate with an external device; and
   a sensor unit configured to capture an image of the external device and provide the image to the processor,
   wherein the processor is further configured to:
      detect the external device from the image,
      recognize a first keyboard component and a first window component from the external device, wherein the first window component of the external device outputs hidden data corresponding to an input signal currently received at the external device via the first keyboard component having a first keyboard layout,
      switch a normal mode of the external device to a protection mode of the external device if the first keyboard component and the first window component from the external device are recognized, wherein the protection mode causes the display of a protection layer over one or more displayed components of the external device,
      generate a second keyboard component corresponding to the first keyboard component and a second window component corresponding to the first window component, wherein the second window component outputs data corresponding to the input signal without hiding the data,
      provide the second keyboard component overlaying the first keyboard component, and
      indicate a key included in the second keyboard component corresponding to the input signal currently received via the first keyboard component,
      wherein the second keyboard component displayed through the display unit of the HMD has a second keyboard layout different from the first keyboard layout of the first keyboard component displayed through the external device, and the input signal is received in accordance with the second keyboard layout of the second keyboard component, and
      wherein each of the first keyboard layout and the second keyboard layout includes a plurality of keys.

2. The HMD of claim 1, wherein the first window component is overlaid with the second window component.

3. The HMD of claim 1, wherein the protection layer is displayed over a screen of the external device.

4. The HMD of claim 3, wherein the protection layer includes a layer which makes contents displayed in the external device unseeable to a user.

5. The HMD of claim 3, wherein an interface for adjusting a display property of the protection layer is provided.

6. The HMD of claim 5, wherein the display property includes at least one of brightness, chroma, and transparency.

7. The HMD of claim 1, wherein the protection layer is displayed over the first window component of the external device.

8. The HMD of claim 1, wherein the protection layer is displayed over the first keyboard component of the external device.

9. The HMD of claim 8, wherein the protection layer includes an outline of the first keyboard component of the external device.

10. The HMD of claim 1, wherein a tactile feedback is provided via the first keyboard component, if a user's touch input to the first keyboard component is detected.

11. The HMD of claim 1, wherein the processor recognizes the first keyboard component and the first window component from the external device when the external device is in the protection mode.

12. The HMD of claim 1, wherein the normal mode of the external device is switched to the protection mode of the external device, if the processor detects a user is wearing the HMD.

13. The HMD of claim 1, wherein indicating the key included in the second keyboard component corresponding to the input signal currently received via the first keyboard component comprises enlarging the key.

14. A method for controlling a Head Mount Display (HMD), the method comprising:
   detecting an external device from an image captured by the HMD,
   recognizing a first keyboard component and a first window component from the external device, wherein the first window component of the external device outputs hidden data corresponding to an input signal currently received at the external device via the first keyboard component having a first keyboard layout,
   switching the external device from a normal mode to a protection mode if the processor recognizes the first keyboard component and the first window component from the external device,
   displaying a protection layer over one or more components of the external device if the external device is in the protection mode,
   generating a second keyboard component corresponding to the first keyboard component and a second window component corresponding to the first window component, wherein the second window component outputs data corresponding to the input signal without hiding data,
   providing the second keyboard component overlaying the first keyboard component, and
   indicating a key included in the second keyboard component corresponding to the input signal currently received via the first keyboard component,
   wherein the second keyboard component displayed corresponding to the first keyboard component has a second keyboard layout different from the first keyboard layout of the first keyboard component and the input signal is received by using the second keyboard layout and in accordance with the second keyboard layout, and wherein each of the first keyboard layout and the second keyboard layout includes a plurality of keys.

15. The method of claim 14, further comprising:
providing the second window component overlaying the first window component.

16. The method of claim 14, further comprising:
wherein the protection layer includes a layer which makes contents displayed in the external device unseeable to a user.

17. The method of claim 14, further comprising:
displaying the protection layer over the first window component of the external device.

18. The method of claim 17, wherein the protection layer includes an outline of the first keyboard component of the external device and a tactile feedback is provided via the first keyboard component, if a user's touch input to the first keyboard component is detected.

19. The method of claim 14, further comprising:
switching the external device from the normal mode to the protection mode if a user is detected wearing the HMD.

20. A Head Mount Display (HMD) for use with an external device, the HIVID comprising:
an at least partially see-through display;
a sensor configured to capture an image;
a processor configured to:
detect the external device in the image;
recognize a first keyboard component including a plurality of keys in a first keyboard layout and a first window component of a first user interface of the external device in the image, wherein the first window component of the external device displays in a hidden format current input data that is input via an input signal to the first keyboard component;
when the first keyboard component and the first window component from the external device are recognized, send an instruction to the external device via a communication unit of the HIVID to cause the external device to switch from a normal mode to a protection mode, wherein the protection mode causes the display of a protection layer over one or more of the first keyboard component and the first window component;
generate a second user interface for display on the at least partially see- through display of the HMD, the second user interface including a second keyboard component including a plurality of keys of a second keyboard layout different than the first keyboard layout, and being displayed at a position corresponding to a position of the first keyboard component so as to overlay the first keyboard component as viewed through the at least partially see-through display, and a second window component displayed at a position corresponding to a position of the first window component so as to at least partially overlay the first window component as viewed through the at least partially see-through display, wherein the second window component displays the current input data in an unhidden format, and wherein the second keyboard component displays a graphical indication of selection of a selected key of the plurality of keys according to the input signal, a value of the selected key being determined according to the second keyboard layout.

\* \* \* \* \*